US012574268B2

(12) United States Patent
Penna et al.

(10) Patent No.: US 12,574,268 B2
(45) Date of Patent: Mar. 10, 2026

(54) METHOD AND DEVICE FOR LEARNING-BASED CHANNEL ESTIMATION WITH DATA PRE-PROCESSING

(71) Applicant: Samsung Electronics Co., Ltd., Gyeonggi-do (KR)

(72) Inventors: Federico Penna, San Diego, CA (US); Hyuk Joon Kwon, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 360 days.

(21) Appl. No.: 18/465,517

(22) Filed: Sep. 12, 2023

(65) Prior Publication Data

US 2024/0414030 A1     Dec. 12, 2024

Related U.S. Application Data

(60) Provisional application No. 63/472,451, filed on Jun. 12, 2023.

(51) Int. Cl.
H04L 25/02 (2006.01)

(52) U.S. Cl.
CPC ...... H04L 25/0232 (2013.01); H04L 25/0204 (2013.01); H04L 25/022 (2013.01); H04L 25/0254 (2013.01); H04L 25/0256 (2013.01)

(58) Field of Classification Search
CPC ............. H04L 25/0232; H04L 25/0204; H04L 25/022; H04L 25/0254; H04L 25/0256; H04L 25/024; H04L 25/0212; H04L 25/0224; H03H 17/04; G06N 3/084
See application file for complete search history.

(56) References Cited

U.S. PATENT DOCUMENTS 10,756,785 B2    8/2020  Zirwas et al.
2005/0185724 A1*  8/2005  Wang .................. H04L 25/0234
                                                    375/260

(Continued)

FOREIGN PATENT DOCUMENTS

CN          112968847        5/2022
WO     WO 2022/244903        5/2021

OTHER PUBLICATIONS

Elbir, Ahmet M. et al., "A Family of Deep Learning Architectures for Channel Estimation and Hybrid Beamforming in Multi-Carrier mm-Wave Massive MIMO", arXiv:1912.10036v6 [eess.SP] Jan. 3, 2022, pp. 15.

(Continued)

*Primary Examiner* — Afshawn M Towfighi
(74) *Attorney, Agent, or Firm* — The Farrell Law Firm, P.C.

(57)     ABSTRACT

Methods and apparatuses are provided in which frequency domain (FD) interpolation is performed on wideband reference signal (RS) resource elements (REs) to generate channel estimates on corresponding RS symbols. Denoising may be performed on the channel estimates in a time domain (TD) or a delay-Doppler domain (DD). Learning-based channel estimation (LCE) is applied on the channel estimates using a neural network (NN) to generate refined channel estimates on the corresponding RS symbols. Time domain (TD) interpolation is performed on the refined channel estimates to produce a channel estimate across symbols.

20 Claims, 8 Drawing Sheets

(56) References Cited

U.S. PATENT DOCUMENTS

| 2006/0109919 A1* | 5/2006 | Nieto | ................. | H04L 25/0232 |
| | | | | 375/346 |
| 2009/0274200 A1* | 11/2009 | Ikram | ................. | H04L 25/0232 |
| | | | | 375/316 |
| 2010/0195580 A1* | 8/2010 | Samarasooriya | ..... | H04W 16/14 |
| | | | | 370/329 |
| 2015/0155993 A1* | 6/2015 | Berggren | ............. | H04L 5/0023 |
| | | | | 370/330 |
| 2022/0329329 A1 | 10/2022 | Ding et al. | | |
| 2022/0337455 A1 | 10/2022 | Kwon et al. | | |
| 2023/0082536 A1 | 3/2023 | Hoydis et al. | | |
| 2023/0300006 A1* | 9/2023 | Abdallah | ............. | H04L 25/022 |
| | | | | 375/267 |
| 2023/0353426 A1* | 11/2023 | Chen | ........................ | G06N 3/09 |
| 2024/0396767 A1* | 11/2024 | Chen | ................. | H04L 25/0254 |

OTHER PUBLICATIONS

Kwon, Hyukjoon, "Bundle-based Channel Estimation for 5G NR with Supervised Learning", GLOBECOM 2020—2020 IEEE Global Communications Conference, Taipei, Taiwan, 2020, pp. 1-6.
Belgiovine, Mauro et al., "Deep Learning at the Edge for Channel Estimation in Beyond-5G Massive MIMO", IEEE Wireless Communications • Apr. 2021, pp. 8.

* cited by examiner

702 — Perform FD interpolation to generate channel estimates

704 — Apply LCE on channel estimates

706 — Perform TD interpolation on refined channel estimates

METHOD AND DEVICE FOR LEARNING-BASED CHANNEL ESTIMATION WITH DATA PRE-PROCESSING

CROSS-REFERENCE TO RELATED APPLICATION

This application claims the priority benefit under 35 U.S.C. § 119 (c) of U.S. Provisional Application No. 63/472, 451, filed on Jun. 12, 2023, the disclosure of which is incorporated by reference in its entirety as if fully set forth herein.

TECHNICAL FIELD

The disclosure generally relates to channel estimation (CE) in wireless communication systems. More particularly, the subject matter disclosed herein relates to improvements to learning-based CE (LCE) with data pre-processing.

SUMMARY

CE is a key feature in wireless communications systems. In an orthogonal frequency division multiplexing (OFDM)-based system, such as, for example, $5^{th}$ Generation (5G) new radio (NR) or $4^{th}$ Generation (4G) long term evolution (LTE), CE may be performed with the aid of pilot symbols (e.g., cell-specific reference signals (CRS) in LTE, or demodulation reference signals (DMRS) in NR) to facilitate the estimation of channel characteristics.

Specifically, information may be transmitted over time-frequency resource elements (REs) on a physical downlink shared channel (PDSCH). Channels of REs over which data is transmitted may need to be estimated. Conventional CE schemes obtain channel estimates for REs containing the pilot symbols, and then interpolate such estimates along the frequency direction and the time direction, thereby obtaining estimated channel values in all REs of interest.

To improve performance, LCE is a CE technique that utilizes one or more neural networks (NNs).

Herein, an LCE architecture is designed for LTE based on wideband reference signals (e.g., CRS). A sliding window implementation of LCE is also provided, which may be applied to both NR and LTE. Further, data pre-processing techniques using domain knowledge are also provided.

The pre-processing techniques are focused on how to transform a dataset (obtained from simulations or experimental measurements) in order to facilitate the task of training a NN. By exploiting domain knowledge derived from conventional CE algorithms, time domain (TD) denoising and delay-Doppler domain (DD) denoising are provided as pre-processing techniques.

The disclosed techniques may improve training performance in terms of normalized mean square error (NMSE), when compared to training without pre-processing.

In an embodiment, a method is provided in which a user equipment (UE) performs frequency domain (FD) interpolation on wideband reference signal (RS) REs to generate channel estimates on corresponding RS symbols (e.g., OFDM symbols where the RS is located). The UE applies LCE on the channel estimates using an NN to generate refined channel estimates on the corresponding RS symbols. The UE performs time domain (TD) interpolation on the refined channel estimates to produce a channel estimate across symbols.

In an embodiment, a method is provided in which a UE generates channel estimates on RS symbols in a FD. The UE converts the channel estimates to a TD or a DD to generate converted channel estimates. The UE performs denoising on the converted channel estimates. The UE applies LCE on the denoised channel estimates to generate refined channel estimates on the RS symbols. The refined channel estimates are converted to the FD.

In an embodiment, a UE is provided having a processor and a non-transitory computer readable storage medium storing instructions. When executed the instructions cause the processor to perform FD interpolation on wideband RS REs to generate channel estimates on corresponding RS symbols. The instructions also cause the processor to apply LCE on the channel estimates using a NN to generate refined channel estimates on the corresponding RS symbols. The instructions further cause the processor to perform TD interpolation on the refined channel estimates to produce a channel estimate across symbols.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
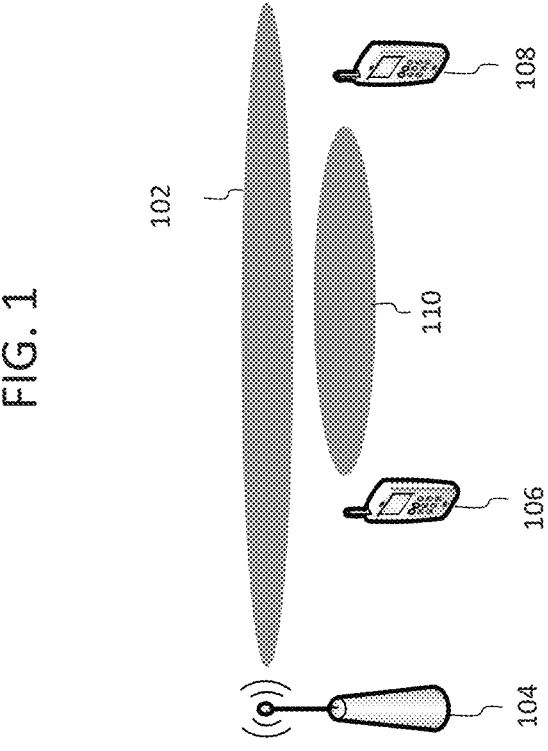
FIG. 1 is a diagram illustrating a communication system, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally inter-changeably used with a corresponding non-hyphenated ver-sion (e.g., "two dimensional," "predetermined," "pixel specific," etc.), and a capitalized entry (e.g., "Counter Clock," "Row Select," "PIXOUT," etc.) may be inter-changeably used with a corresponding non-capitalized ver-sion (e.g., "counter clock," "row select," "pixout," etc.). Such occasional interchangeable uses shall not be consid-ered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describ-ing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this speci-fication, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and case of discussion only; it does not imply that the construction or architectural details of such components or units are the same across all embodi-ments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combi-nation of software, firmware and/or hardware configured to provide the functionality described herein in connection with a module. For example, software may be embodied as a software package, code and/or instruction set or instruc-tions, and the term "hardware," as used in any implemen-tation described herein, may include, for example, singly or in any combination, an assembly, hardwired circuitry, pro-grammable circuitry, state machine circuitry, and/or firm-ware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 is a diagram illustrating a communication system, according to an embodiment. In the architecture illustrated in FIG. 1, a control path 102 may enable the transmission of control information through a network established between a gNode B (gNB) 104, a first UE 106, and a second UE 108. A data path 110 may enable the transmission of data (and some control information) on a sidelink (SL) between the first UE 106 and the second UE 108. The control path 102 and the data path 110 may be on the same frequency or may be on different frequencies.

Figure 2:
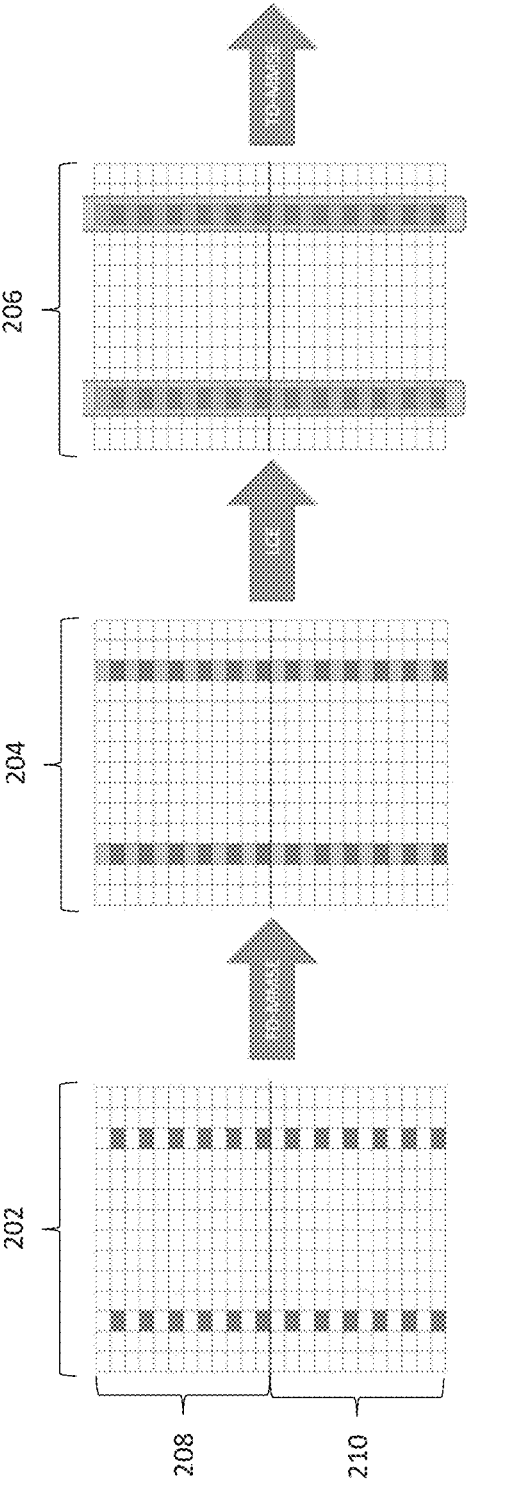
FIG. 2 is a diagram illustrating a processing architecture of DMRS-based LCE, according to an embodiment.

FIG. 2 is a diagram illustrating a processing architecture of DMRS-based LCE, according to an embodiment. The purpose of LCE in NR may be to enhance the CE perfor-mance of PDSCH, which carries data symbols in NR, thereby reducing the block error rate (BLER) and increasing the throughput. The reference signal used in NR for PDSCH CE may be DMRS. In FIG. 2 it may be assumed that DMRS type 1 is configured on two symbols per slot. However, embodiments are not limited to DMRS type 1, and alternate embodiments may also cover DMRS type 2 or different numbers of DMRS symbols per slot.

Referring to FIG. 2. DMRS REs 202 are provided as input for FD-minimum mean square error (MMSE). Two resource blocks (RBs) are shown (a first RB 208 and a second RB 210) with six DMRS REs per symbol in a single RB, and hence, 12 DMRS REs are provided per symbol. An FD interpolator (e.g., FD-MMSE) produces an output of DMRS symbols 204 having 24 REs per symbol.

LCE consists of a training stage and an inference stage. An NN (e.g., a multi-layer perceptron (MLP)) may be trained with pairs of ideal channel samples and estimated channel samples at the output of the FD-MMSE. The MLP may have a single hidden layer with, for example, 32 nodes. The activation function for the hidden layer may be a rectified linear unit (RcLU).

At the inference stage, the trained MLP may be applied to refine the FD-MMSE output. Input and output of the MLP have the same size (e.g., the number of interpolated subcar-riers in a processing bundle may be 1 or 2 RB). The LCE processing bundle may coincide with the a precoding resource group (PRG) configured by the gNB, or it may be a subset of the PRG.

Referring back to FIG. 2, the DMRS symbols 204 are provided as input to LCE, and refined estimates on the DMRS symbols 206, with 24 REs per symbol, are output. The refined estimates on the DMRS symbols 206 are pro-vided as input to TD-MMSE to produce a CE on all REs.

With respect to an LCE architecture for a CRS-based CE in LTE, similar to DMRS-based CE described above, LCE receives the FD-MMSE interpolated output, and outputs a refined estimated channel in the FD. Then, TD interpolation (e.g., TD-MMSE) may be applied to interpolate the LCE output at different OFDM symbols.

Figure 3:
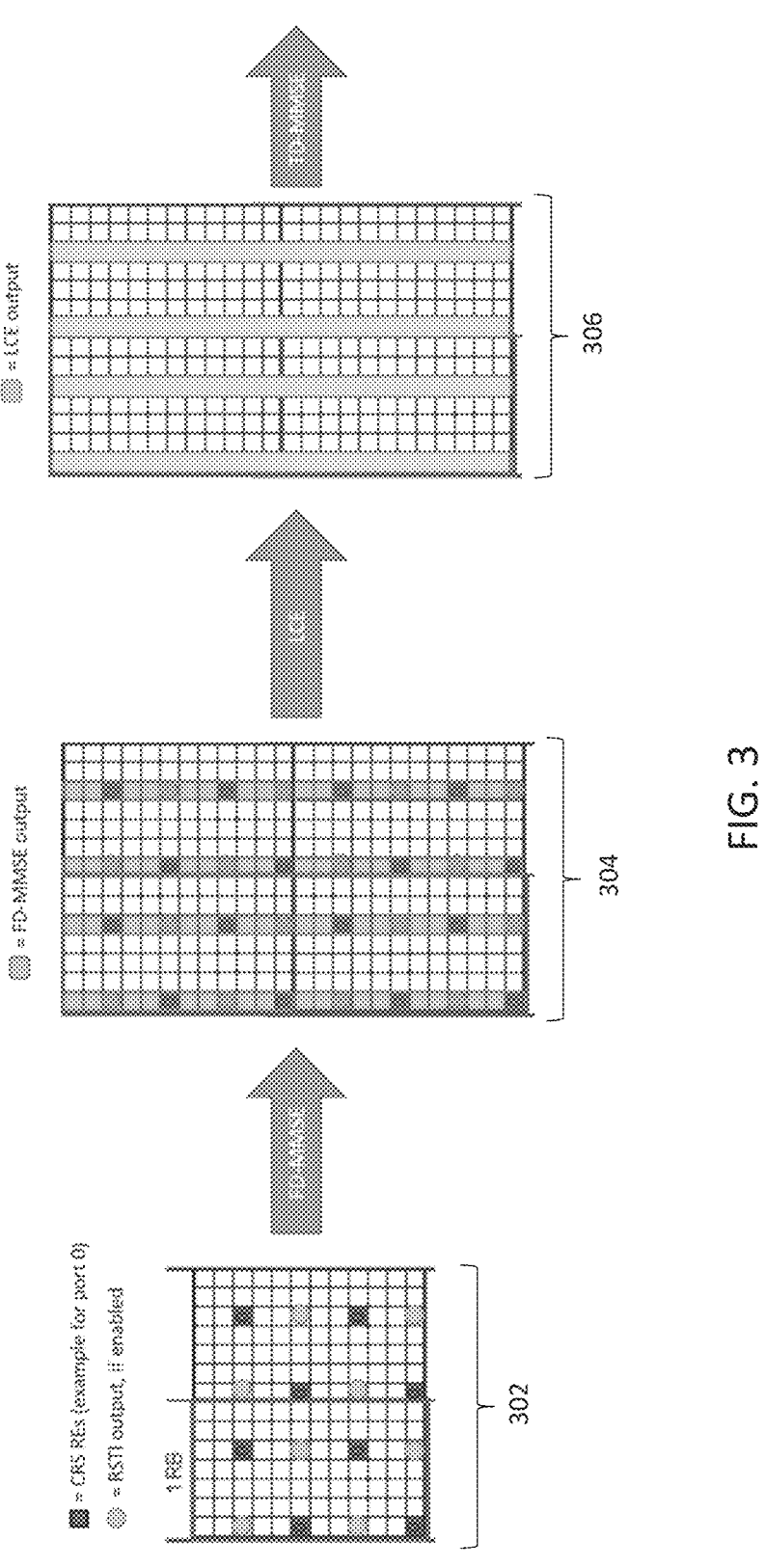
FIG. 3 is a diagram illustrating a processing architecture for a wideband-based LCE, according to an embodiment.

FIG. 3 is a diagram illustrating a processing architecture for a wideband-based LCE, according to an embodiment. LTE has several transmission modes, and depending on the transmission mode, either CRS or DMRS may be used as an RS. CRS-based CE in LTE may be used for a PDSCH or a physical downlink control channel (PDCCH). Thus, LCE may be used to enhance either PDSCH CE or the PDCCH CE performance.

Referring to FIG. 3, CRS REs 302 are provided as input for FD-MMSE. Two CRS REs may be provided per symbol when reference signal time interpolation (RSTI) is not enabled, and four CRS REs may be provided per symbol when RSTI is enabled. FD-MMSE may be applied with a sliding window over the entire bandwidth, which is described in greater detail below with respect to FIG. 4. The number of FD-MMSE taps may be 6 or 12, depending on whether RSTI is enabled or disabled.

FD-MMSE produces an output on CRS symbols 304 over two RBs, which are provided as input to be processed jointly by LCE. Each CRS symbol may be processed separately. LCE input and output size may be 24 complex numbers. Real and imaginary parts may be processed separately, with the same NN, and the effective input/output size for the NN may be 24 real numbers. Unlike DMRS, CRS is a wideband reference signal. Therefore, there is no concept of PRG.

The NN may be a fully connected MLP with a single hidden layer having 32 hidden nodes. The MLP size may be 24×32×24. The activation function for the hidden layer may be an ReLU.

LCE may be applied directly to the channel samples in the FD, or with a transformation to the DD (by applying a discrete Fourier transform (DFT)/fast Fourier transform (FFT) matrix), or with an ad-hoc pre-processing based on domain knowledge (i.e., mimicking the operation of TD denoising used for wideband channel estimation (WBCE)).

At an inference time, LCE may be applied to each CRS symbol and each layer separately. The first two layers (e.g., CRS ports 0 and 1) may have four CRS symbols, while the remaining layers (e.g., CRS ports 2 and 3) may only have two CRS symbols.

Referring back to FIG. 3, the LCE outputs refined estimates on the CRS symbols 306, which may be provided as input to TD-MMSE to produce a CE on all REs.

A sliding window implementation of LCE may be provided for both NR and LTE. LCE processes chunks of data (also referred to as LCE processing bundles) in the FD. One processing bundle may be, for example, 1 or 2 RBs. This sliding window implementation may be provided to alleviate degradation of CE quality at the edges of each bundle.

Figure 4:
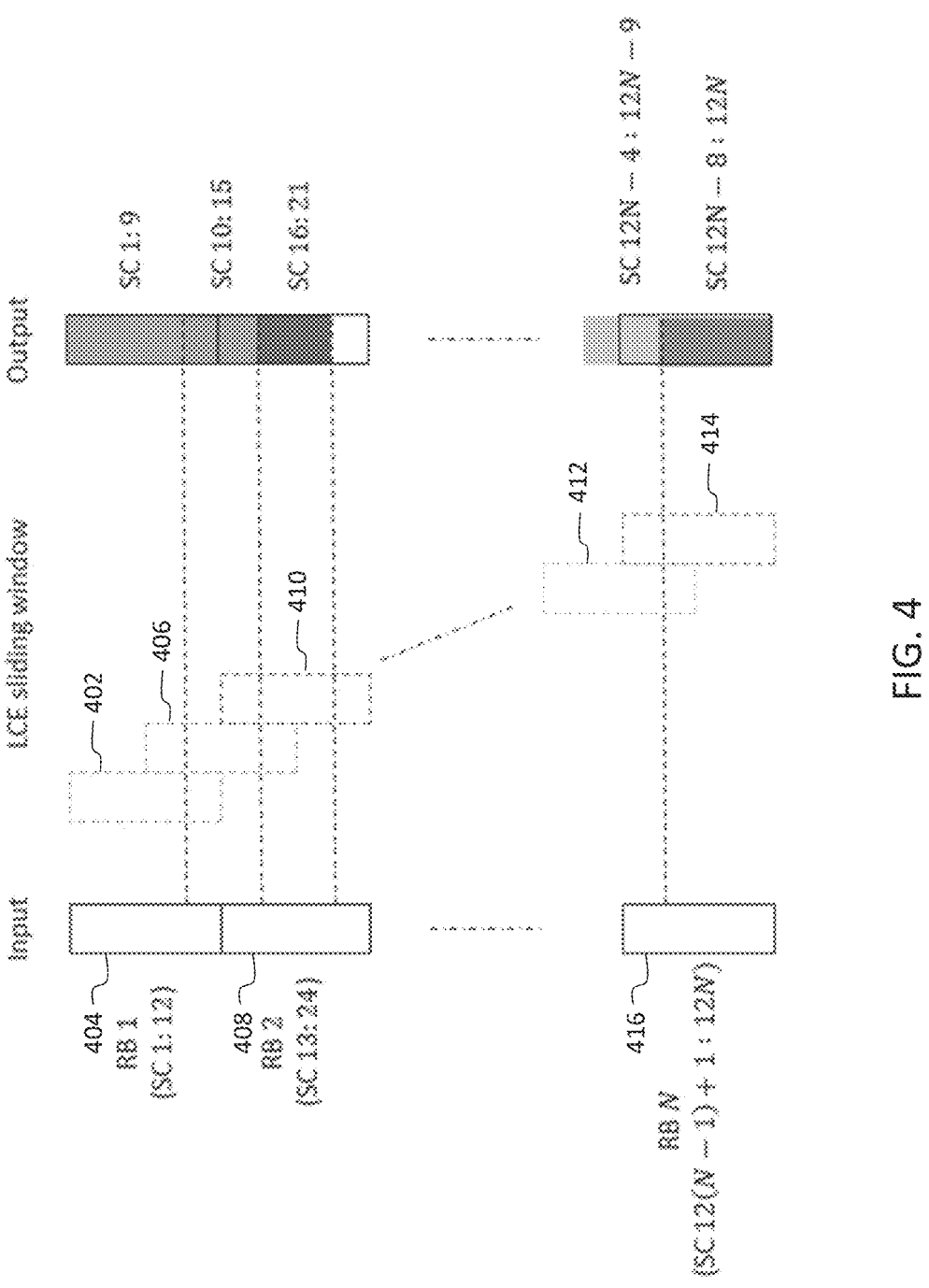
FIG. 4 is a diagram illustrating a sliding window implementation for LCE, according to an embodiment.

FIG. 4 is a diagram illustrating a sliding window implementation for LCE, according to an embodiment. It may be assumed that the LCE processing bundle consists of a single RB (12 subcarriers). A first LCE processing bundle 402 may coincide with a first RB (subcarriers 1 to 12) 404. A second LCE processing bundle 406 may not cover a second RB 408 but instead, may be shifted by a fractional amount with respect to the first LCE processing bundle 402 (e.g., ½ RB or six subcarriers). Similarly, each subsequent LCE processing bundle 410, 412 may be shifted by the same fractional amount, until the last bundle 414 which covers a last RB 416.

Shifting the LCE processing bundles results in some overlap among the bundles, which enables avoidance of using LCE outputs corresponding to the edges of each bundle. FIG. 3 illustrates that the final output consists of the six central subcarriers of each bundle. The edges (first three and last three subcarriers) may be discarded, because they are covered by the adjacent bundles. The only exceptions are the first and the last bundles, for which nine subcarriers are used for the final output.

The shifting of ½ RB (six subcarriers) is provided as an example and embodiments are not limited thereto. The shifting may be as little as one subcarrier. The smaller the step, the higher the complexity because the number of bundles increases.

Data pre-processing relates to the transformation of a dataset (obtained from simulations or experimental measurements) in order to facilitate the training of the NN. h may be set to a FD complex channel sample vector collected at the output of the FD interpolator for a single OFDM symbol containing pilot signals, which is shown as DMRS symbols 204 of FIG. 2 or 304 in FIG. 3. Assuming an LCE processing bundle size of two RB, the vector h may consists of 24 samples. This size may be assumed for sake of illustration in the description below, however, embodiments are not limited to a specific size.

The simplest option for LCE may be to train the NN directly with samples h (e.g., $h_1$, . . . , $h_n$) and, at the inference time, apply the NN, as shown Equation (1) below.

$$h_{refined} = f_\Theta(h) \tag{1}$$

where $f_\Theta(\cdot)$ represents the MLP input-output relation, which may be a function of weight/bias parameters $\Theta$ for all layers.

With respect to transformation to the DD, instead of directly applying LCE in the FD, it may be beneficial to convert the channel samples to the DD by applying a DFT or FFT (with zero padding). Defining $h_{ZP}=$ $[h \ 0 \ . . . \ 0]^T \in \mathbb{C}^{32 \times 1}$ by a zero-padded version of the frequency-domain channel vector $h \in \mathbb{C}^{24 \times 1}$, the DD channel may be obtained by Equation (2) below.

$$h_D = F h_{ZP} \tag{2}$$

where F may be a 32×32 FFT matrix. NN training may be performed with samples $h_D$ (e.g., $h_{D,1}$, . . . , $h_{D,n}$); inference may be applied in the transformed domain as well, resulting in Equation (3) below.

$$h_{D,refined} = f_\Theta(h_D) \tag{3}$$

and the refined FD channel may be recovered by Equation (4) below.

$$h_{refined} = F^H h_{D,refined}. \tag{4}$$

The pre-processing option may be based on the idea of applying domain knowledge. Since it is known that WBCE performs better than narrowband channel estimation (NBCE) in PDCCH CE due to the wideband nature of CRS, the same processing of WBCE may be applied (i.e., TD denoising) to the channel vectors $h \in \mathbb{C}^{24 \times 1}$. TD denoising may be interpreted as a heuristic pre-processing technique, which does not have the same theoretical justification as the TD denoising used for WBCE.

In addition, a variation of the same pre-processing technique may be considered that operates in the DD instead of the TD. TD and DD transformations are formally similar. In one case inverse FFT (IFFT) may be used, in the other case FFT may be used. This alternative pre-processing technique may be referred to as DD denoising.

In summary, two pre-processing approaches, TD denoising and DD denoising, are proposed based on domain knowledge.

Figure 5:
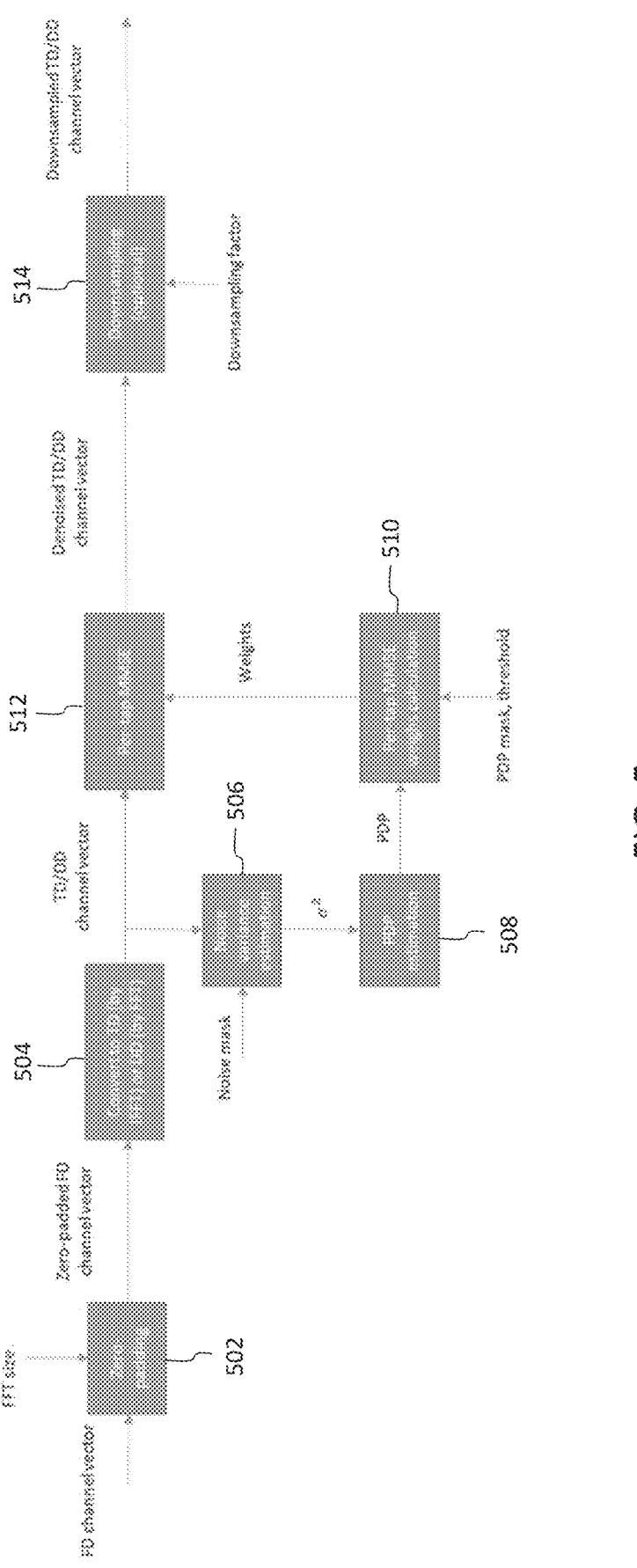
FIG. 5 is a diagram illustrating a system for TD/DD denoising pre-processing, according to an embodiment.

FIG. 5 is a diagram illustrating a system for TD/DD denoising pre-processing, according to an embodiment.

The FFT size may be determined as shown in Equation (5) below.

$$N_{FFT} = K \cdot 2^{\lceil log_2 N \rceil} \qquad (5)$$

where N may be the size of the complex FD channel vector h, and K≥1 may be an arbitrary upsampling factor.

Zero padding may be performed, at 502, using the FD channel vector h and the FFT size $N_{FFT}$, as shown in Equation (6) below.

$$h_{ZP} = [\, h \quad 0 \quad \ldots \quad 0\,]^T \in \mathbb{C}^{N_{FFT} \times 1} \qquad (6)$$

Conversion to TD may be performed, at 504, using the zero-padded FD channel vector $h_{ZP}$, as shown in Equation (7) below.

$$h_T = F^H h_{ZP} \qquad (7)$$

Alternatively, conversion to DD may be performed by Equation (8) below.

$$h_T = F h_{ZP} \qquad (8)$$

where $F \in \mathbb{C}^{N_{FFT} \times N_{FFT}}$ may be an FFT matrix.

Noise variance (NV) estimation may be performed, at 506, by taking the average energy of the TD/DD channel vector hr within a predefined noise mask $\mathcal{N}$, which selects the time samples that are expected to contain only noise and no channel taps, as shown in Equation (9) below.

$$\sigma^2 = \mathbb{E}\left[\frac{1}{|\mathcal{N}|} \sum_{i \in \mathcal{N}} |h_T[i]|^2 \right] \qquad (9)$$

The expectation $\mathbb{E}[\cdot]$ may be taken with respect to all the available realizations of $h_T$ (i.e., the training dataset), while the average within the noise mask may be taken for each individual realization.

Power delay profile (PDP) estimation may be performed, at 508, using the estimated noise variance $\sigma^2$, as shown in Equation (10) below.

$$P_i = \max\left(\mathbb{E}|h_T[i]|^2 - \sigma^2, 0\right) \qquad (10)$$

$i \in \{1, \ldots, N_{FFT}\}$, and the expectation $\mathbb{E}$ may be taken with respect to all realizations for each time index i. The result may be lower-bounded by 0 to avoid negative values, which would have no physical meaning (these may occur if the dataset is not large enough and/or if the NV estimation is inaccurate).

Per-tap MMSE weights may be initially computed, at 510, using the estimated PDP $P_i$, as shown in Equation (11) below.

$$w_i' = \frac{P_i}{P_i + \sigma^2} \qquad (11)$$

In addition, tap masking and tap thresholding may be applied. By tap masking, the weights within a predefined PDP mask (which is typically the same as the noise mask $\mathcal{N}$) are set to zero. By tap thresholding, the weights that are below a certain threshold $\beta\sigma^2$ are set to zero, where $\beta$ may be a configurable parameter (e.g., $\beta$=0.5). Thus, the final weights may be shown as Equation (12) below.

$$w_i = \begin{cases} 0 & \text{if } i \in \mathcal{N} \text{ or } w_i' < \beta\sigma^2 \\ w_i' & \text{otherwise} \end{cases} \qquad (12)$$

Then, per-tap MMSE may be applied, at 512, using the weights $w_i$ and the TD/DD channel vector hr, as shown in Equation (13) below.

$$h_{T,denoised} = w^T h_T \qquad (13)$$

where $w=[w_1, \ldots, w_{N_{FFT}}]^T$.

Finally, if upsampling (K>1) was applied in determining the FFT size (3-5), the denoised output may be downsampled, at 514, using the denoised TD/DD channel vector $R_{T,denoised}$, before being passed as input to the NN, as shown in Equation (14) below.

$$h_{T,denoised}' = h_{T,denoised}(1\colon K\colon N_{FFT}) \qquad (14)$$

This downsampling step may be optional and may be taken to reduce the NN input size.

After pre-processing, the NN may be trained with samples $h_{T,denoised}$ (or $R_{T,denoised}$). At the inference stage, LCE may be applied in the TD/DD domain as shown in Equation (15) below.

$$h_{T,refined} = f_\Theta(h_{T,denoised}) \qquad (15)$$

The result may be converted back to the FD by inverting Equation (7) or (8), as shown in Equation (16) below for the TD case.

$$h_{refined} = F h_{T,refined} \qquad (16)$$

Equation (17) is shown for the DD case.

$$h_{refined} = F^H h_{T,refined} \qquad (17)$$

Finally, the size of $h_{refined}$ may be reduced to N by removing the samples corresponding to the added zeros in Equation (6).

Figure 6:
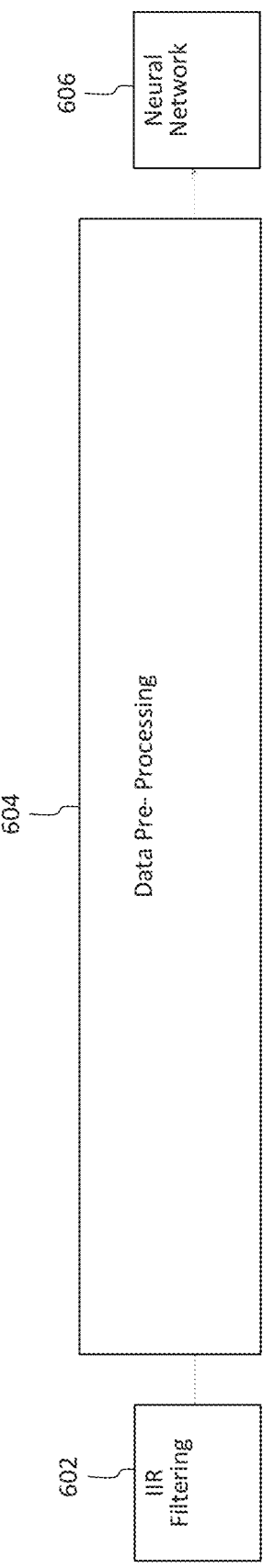
FIG. 6 is a diagram illustrating a system for LCE pre-processing, according to an embodiment.

FIG. 6 is a diagram illustrating a system for LCE pre-processing, according to an embodiment. Infinite impulse response (IIR) filtering 602 may be performed before data pre-processing 604. The purpose IIR filtering 602 may be to smooth the channel variations in time before pre-processing 604 and training and NN processing at 606. The steps of the data pre-processing at 604 are described in detail above with respect to FIG. 5.

Figure 7:
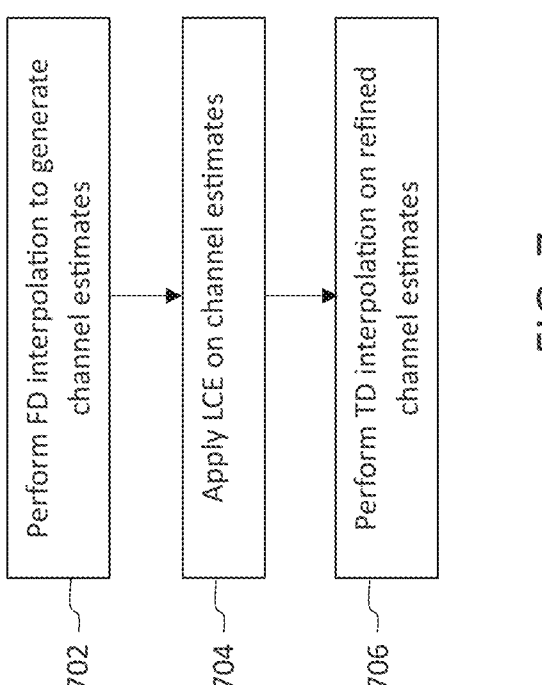
FIG. 7 is a flowchart illustrating a method for performing LCE, according to an embodiment.

FIG. 7 is a flowchart illustrating a method for LCE processing, according to an embodiment. At 702, a UE performs FD interpolation on wideband RS REs to generate channel estimates on corresponding RS symbols. The wideband RS may be a CRS, and the FD interpolation may be FD-MMSE interpolation.

At 704, the UE applies LCE on the channel estimates using a NN to generate refined channel estimates on the corresponding RS symbols. The NN may be an MLP having a hidden layer with an activation layer of a ReLU. LCE processing may be applied in accordance with a sliding window across bundles of channel estimates. TD or DD denoising pre-processing may be performed on the channel estimates before applying the LCE.

At 706, the UE performs TD interpolation on the refined channel estimates to produce a channel estimate across symbols. The TD interpolation may be TD-MMSE interpolation.

Figure 8:
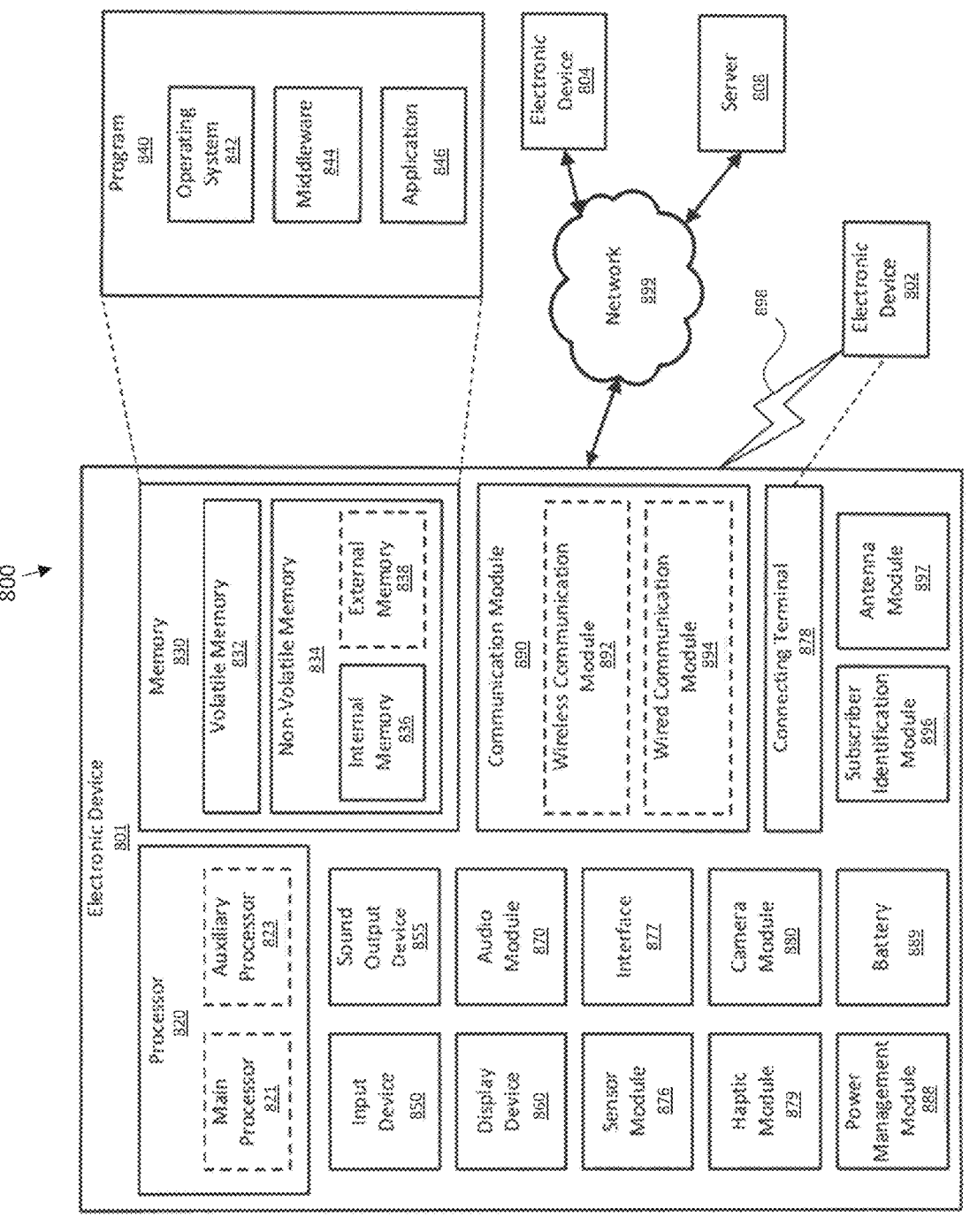
FIG. 8 is a block diagram of an electronic device in a network environment, according to an embodiment.

FIG. 8 is a block diagram of an electronic device in a network environment 800, according to an embodiment.

Referring to FIG. 8, an electronic device 801 in a network environment 800 may communicate with an electronic device 802 via a first network 898 (e.g., a short-range wireless communication network), or an electronic device 804 or a server 808 via a second network 899 (e.g., a long-range wireless communication network). The electronic device 801 may communicate with the electronic device 804 via the server 808. The electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) card 896, or an antenna module 897. In one embodiment, at least one (e.g., the display device 860 or the camera module 880) of the components may be omitted from the electronic device 801, or one or more other components may be added to the electronic device 801. Some of the components may be implemented as a single integrated circuit (IC). For example, the sensor module 876 (e.g., a fingerprint sensor, an iris sensor, or an illuminance sensor) may be embedded in the display device 860 (e.g., a display).

The processor 820 may execute software (e.g., a program 840) to control at least one other component (e.g., a hardware or a software component) of the electronic device 801 coupled with the processor 820 and may perform various data processing or computations.

As at least part of the data processing or computations, the processor 820 may load a command or data received from another component (e.g., the sensor module 876 or the communication module 890) in volatile memory 832, process the command or the data stored in the volatile memory 832, and store resulting data in non-volatile memory 834. The processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or execute a particular function. The auxiliary processor 823 may be implemented as being separate from, or a part of, the main processor 821.

The auxiliary processor 823 may control at least some of the functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). The auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834. Non-volatile memory 834 may include internal memory 836 and/or external memory 838.

The program 840 may be stored in the memory 830 as software, and may include, for example, an operating system (OS) 842, middleware 844, or an application 846.

The input device 850 may receive a command or data to be used by another component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. The display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. The audio module 870 may obtain the sound via the input device 850 or output the sound via the sound output device 855 or a headphone of an external electronic device 802 directly (e.g., wired) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. The sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device 802 directly (e.g., wired) or wirelessly. The interface 877 may include, for example, a high-definition multimedia interface (HDMI), a universal serial bus (USB) interface, a secure digital (SD) card interface, or an audio interface.

A connecting terminal 878 may include a connector via which the electronic device 801 may be physically connected with the external electronic device 802. The connecting terminal 878 may include, for example, an HDMI connector, a USB connector, an SD card connector, or an audio connector (e.g., a headphone connector).

The haptic module 879 may convert an electrical signal into a mechanical stimulus (e.g., a vibration or a movement) or an electrical stimulus which may be recognized by a user via tactile sensation or kinesthetic sensation. The haptic module 879 may include, for example, a motor, a piezo-electric element, or an electrical stimulator.

The camera module 880 may capture a still image or moving images. The camera module 880 may include one or more lenses, image sensors, image signal processors, or flashes. The power management module 888 may manage power supplied to the electronic device 801. The power management module 888 may be implemented as at least part of, for example, a power management integrated circuit (PMIC).

The battery 889 may supply power to at least one component of the electronic device 801. The battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the AP) and supports a direct (e.g., wired) communication or a wireless communication. The communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as BLUETOOTH™, wireless-fidelity (Wi-Fi) direct, or a standard of the Infrared Data Association (IrDA)) or the second network 899 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. The antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

Commands or data may be transmitted or received between the electronic device 801 and the external electronic device 804 via the server 808 coupled with the second network 899. Each of the electronic devices 802 and 804 may be a device of a same type as, or a different type, from the electronic device 801. All or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:
   performing, by a user equipment (UE), frequency domain (FD) interpolation on wideband reference signal (RS) resource elements (REs) to generate channel estimates on corresponding RS symbols;
   applying, by the UE, learning-based channel estimation (LCE) on the channel estimates using a neural network (NN) to generate refined channel estimates on the corresponding RS symbols; and
   performing, by the UE, time domain (TD) interpolation on the refined channel estimates to produce a channel estimate across symbols.

2. The method of claim 1, wherein the wideband RS comprises a cell-specific RS (CRS).

3. The method of claim 1, wherein the FD interpolation comprises FD-minimum mean square error (FD-MMSE) interpolation, and the TD interpolation comprises TD-MMSE interpolation.

4. The method of claim 3, wherein enabling reference signal time interpolation (RSTI) increases a first number of wideband RS REs provided per symbol and increases a second number of taps for the FD-MMSE interpolation.

5. The method of claim 1, wherein the LCE is applied on bundles of resource blocks (RBs) with an NN having a same input and output size.

6. The method of claim 1, wherein the NN comprises a multi-layer perceptron (MLP) having a hidden layer comprising hidden nodes, wherein an activation function for the hidden layer is a rectified linear unit (ReLU).

7. The method of claim 1, further comprising:
   transforming the channel estimates to a delay-Doppler domain (DD) prior to applying the LCE; and
   transforming the refined channel estimated to the FD after applying the LCE.

8. The method of claim 1, wherein the LCE is applied, in a sliding-window manner, to bundles of the estimated channel samples, and the bundles overlap in the FD, such that a predefined number of overlapping subcarriers at one or more edges of each bundle are removed from LCE processing.

9. The method of claim 1, further comprising:
   before applying the LCE, converting, by the UE, the channel estimates to a time domain (TD) or a delay-Doppler domain (DD) to generate converted channel estimates, and performing, by the UE, denoising on the converted channel estimates; and
   converting the refined channel estimates to the FD after applying LCE.

10. The method of claim 9, further comprising:
    performing, by the UE, zero-padding on the channel estimates based on a fast Fourier transform (FFT) size, prior to converting to the TD or DD.

11. The method of claim 9, wherein performing denoising comprises:
    estimating, by the UE, a noise variance based on an average energy of the converted channel estimates within a predefined noise mask;
    estimating, by the UE, a power delay profile (PDP) using the estimated noise variance;
    determining, by the UE, per-tap minimum mean square error (MMSE) weights based on the estimated PDP, a predefined PDP mask, and a noise variance threshold; and
    applying, by the UE, the per-tap MMSE weights to the converted channel estimates to generate denoised channel estimates.

12. The method of claim 9, further comprising:
    before converting the channel estimates, performing infinite impulse ratio (IIR) filtering on the channel estimates.

13. A method comprising:
    generating, by a user equipment (UE), channel estimates on reference signal (RS) symbols in a frequency domain (FD);
    converting, by the UE, the channel estimates to a time domain (TD) or a delay-Doppler domain (DD) to generate converted channel estimates;
    performing, by the UE, denoising on the converted channel estimates;
    applying, by the UE, learning-based channel estimation (LCE) on the denoised channel estimates to generate refined channel estimates on the RS symbols;

converting the refined channel estimates to the FD; and performing, by the UE, TD interpolation on the refined channel estimates to produce a channel estimate across symbols.

14. The method of claim 13, further comprising:

performing, by the UE, zero-padding on the channel estimates based on a fast Fourier transform (FFT) size, prior to converting to the TD or DD.

15. The method of claim 13, wherein performing denoising comprises:

estimating, by the UE, a noise variance based on an average energy of the converted channel estimates within a predefined noise mask;

estimating, by the UE, a power delay profile (PDP) using the estimated noise variance;

determining, by the UE, per-tap minimum mean square error (MMSE) weights based on the estimated PDP, a predefined PDP mask, and a noise variance threshold; and applying, by the UE, the per-tap MMSE weights to the converted channel estimates to generate the denoised channel estimates.

16. The method of claim 13, further comprising:

before converting the channel estimates, performing infinite impulse ratio (IIR) filtering on the channel estimates.

17. A user equipment (UE) comprising:

a processor; and a non-transitory computer readable storage medium storing instructions that, when executed, cause the processor to:

perform frequency domain (FD) interpolation on wideband reference signal (RS) resource elements (REs) to generate channel estimates on corresponding RS symbols;

apply learning-based channel estimation (LCE) on the channel estimates using a neural network (NN) to generate refined channel estimates on the corresponding RS symbols; and performing time domain (TD) interpolation on the refined channel estimates to produce a channel estimate across symbols.

18. The UE of claim 17, wherein, in applying the LCE, the instructions further cause the processor to apply the LCE, in a sliding-window manner, to bundles of the estimated channel samples, and the bundles overlap in the FD, such that a predefined number of overlapping subcarriers at one or more edges of each bundle are removed from LCE processing.

19. The UE of claim 17, wherein the instructions further cause the processor to:

before applying the LCE, convert the channel estimates to a time domain (TD) or a delay-Doppler domain (DD) to generate converted channel estimates, and perform denoising on the converted channel estimates; and convert the refined channel estimates to the FD after applying LCE.

20. The UE of claim 19, wherein, in performing denoising, the instructions further cause the processor to:

estimate a noise variance based on an average energy of the converted channel estimates within a predefined noise mask;

estimate a power delay profile (PDP) using the estimated noise variance;

determine per-tap minimum mean square error (MMSE) weights based on the estimated PDP, a predefined PDP mask, and a noise variance threshold; and apply the per-tap MMSE weights to the converted channel estimates to generate denoised channel estimates.

* * * * *